Aug. 4, 1931.                C. S. BROCK                    1,817,174
                   ARTICLE AND METHOD OF MAKING THE SAME
                          Filed Aug. 19, 1927
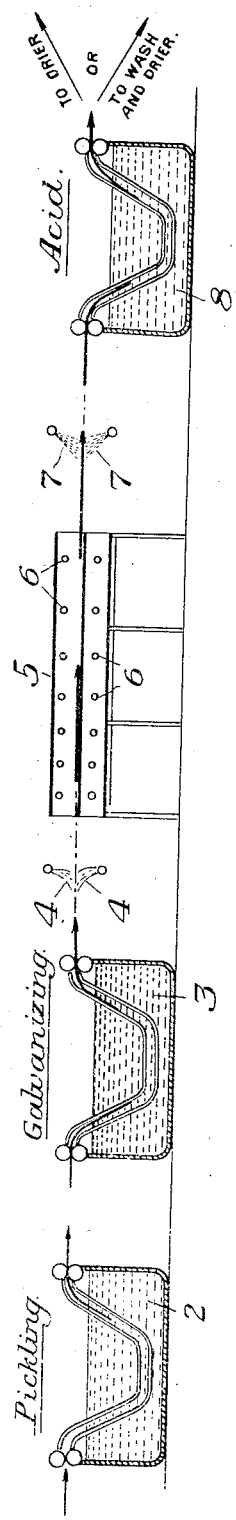
INVENTOR
Clarence S. Brock
by Byrnes, Stebbins & Parmelee
his attorneys Patented Aug. 4, 1931

1,817,174

UNITED STATES PATENT OFFICE

CLARENCE S. BROCK, OF YOUNGSTOWN, OHIO

ARTICLE AND METHOD OF MAKING THE SAME

Application filed August 19, 1927. Serial No. 214,051.

The present invention relates broadly to articles having a protective coating thereon, and especially a protective coating of zinc, and to a method of treating articles of this type to improve the characteristics thereof from the standpoint of appearance and from the standpoint of their ability to provide an effective bond with the subsequently applied coating of paint or the like.

The present invention may be utilized not only in connection with sheets, bars, special shapes and the like, but in connection with any articles with which characteristics in accordance with the present invention are desired. Throughout the specification and claims, therefore, I use the term "articles" in its generic sense as definitive of a wide variety of shapes and articles without regard to their configuration.

In accordance with the ordinary methods of galvanizing, there is produced a protective coating having a generally spangled appearance. Experience has shown that such a coating is not adapted to the immediate reception of paint without special treatment. It has heretofore been proposed to improve the paint adherent characteristics of galvanized articles by forming a priming deposit or coating thereon by the use of a mixture of mineral acids such as phosphoric acid and nitric acid. While such a treatment is particularly advantageous by reason of the character of the deposit formed, I believe that it is equally advantageous by reason of its tendency to oxidize the spangles and thereby prevent objectionable oxidation thereof after the application of the coating.

There has recently been developed an improved method of coating by means of which spangles are eliminated and an article produced having a greater quantity of tight zinc coating per unit of area. Such a coating may be produced as disclosed, for example, in the patent of C. A. Davis, No. 1,732,504, granted October 22, 1929, by subjecting a zinc coated article to predetermined gradations of temperature during the cooling thereof, and preferably by subjecting a coated article to an increased temperature prior to the controlled cooling. An article so produced provides an oxidized coating having paint adherent characteristics, the article lending itself to deformation such as required for fabrication, shaping or the like without objectionable peeling of the coating.

I have found, however, that while extremely desirable results are produced in accordance with this improved method, the resulting articles have a slight discoloration or stain which is objectionable where they are to be used in exposed places without additional coating. I have further found that such discoloration or stain, which will hereinafter be referred to generically as "discoloration", may be effectively removed by treatment of the article in an acid solution having such characteristics that the solution has a more pronounced action on the discoloration than it has on the coating. By such action, the discoloration is removed and there is produced an article having a uniform and pleasing appearance, and possessing extremely desirable characteristics from the standpoint of paint adherence.

My invention, therefore, specifically contemplates the production of an article in such manner that an oxidizing coating having paint adherent characteristics is produced and the subjecting of such article with its previously applied coating to an acid solution to improve its appearance.

In the accompanying drawings, I have shown more or less diagrammatically, for purposes of illustration only, one form of apparatus by means of which an article having characteristics as herein contemplated may be produced, it being understood that the drawings do not define the limits of my invention as changes in the construction and arrangement of the component parts as well as in the method of applying the coating or the method of subjecting the articles to an acid solution may be made without departing either from the spirit of the invention or the scope of my broader claims.

In accordance with the diagrammatic showing of the drawings, an article may be passed first through a cleaning or pickling bath 2 in accordance with standard practice to clean the surfaces thereof preparatory to its passage through a suitable galvanizing bath 3. Upon leaving the galvanizing bath which may be maintained at a temperature of from 800 to 1000° F, the article may be subjected to the action of a heating means 4 effective for raising the temperature at least of the coating to such an extent that crystallization thereof to the extent required to form spangles is prevented. Thereafter, the coated article may be passed through controlled temperature zones, such, for example, as provided by a lehr or heat treating apparatus 5 having spaced heating elements 6 capable of maintaining zones of gradually decreasing temperature characteristics from one end thereof to the other.

With such a treatment, there is produced an article having an oxidized paint adherent coating of the character referred to, but also having the objectionable discoloration set forth. In order to eliminate the discoloration, the coated article may be suitable cooled, as, for example, by the use of air blasts, water jets or water baths 7 and then passed into a bath 8 comprising an acid solution capable of removing the discoloration without objectionably attacking the zinc coating.

I have found that in accordance with the present invention extremely desirable results may be produced by the use of any organic or mineral acids of such nature that a solution thereof has a more pronounced action on the discoloration than on the coating.

Of the mineral acids I have found that phosphoric acid and boric acid are particularly desirable, it being possible by the use of weak solutions of these acids to effect removal of the discoloration in an extremely brief space of time, such as encountered by merely passing the articles therethrough to produce the results desired without objectionably attacking the zinc coating. Of the organic acids I prefer to utilize citric acid, formic acid, tannic acid or tartaric acid, such acids also having characteristics as set forth. Desirable results may also be produced by a mixture of mineral and organic acids such as obtained, for example, by the use of phosphoric acid and citric acid. Due to the previously oxidized character of the coating before the same is subjected to the action of the acid solution, the solution is not called upon to perform an oxidizing action such as is required with ordinary galvanized articles and is effective entirely in the uniform elimination of discoloration and the possible precipitation on the article of a coating which may subsequently be removed by washing or it may be retained by a simple drying process for any paint adherent characteristics which it may have.

As will be well understood by those skilled in the art, the invention is not limited to the use directly of free acids of the character referred to, it being possible to obtain results of the character contemplated by the use, for example, of acid salts. The desired results may also be obtained by the use of mineral or organic salts in solution with an acid capable of replacing the acid radical of the salt, thereby producing the acid desired.

The term paint as herein used is used generically as including within its definition enamel, japanning, the use of phenolic condensation products and the like, in addition to ordinary painting.

Certain advantages of the present invention arise from the treatment of an article having a paint adherent coating of a protective nature with an acid solution such that the paint adherent property of the coating is preserved and its appearance improved.

Other advantages of the invention arise from a method of producing an improved article by the steps of cleaning and coating in said manner that a paint adherent coating preferably of an oxidized nature is produced and thereafter treating the coated article with an acid solution such as to remove discoloration and produce a deposit, the paint adherent characteristics of which may or may not be utilized, depending upon whether the article is subsequently washed and dried or merely dried.

I claim:

1. In the method of treating articles having an oxidized zinc coating thereon to remove discoloration, the step consisting in subjecting a previously oxidized coating to the action of an acid solution having a more pronounced action on the discoloration than on the coating.

2. In the method of producing articles of manufacture, the steps comprising subjecting a metal body to the action of a cleaning agent, subjecting the cleaned body to a galvanizing process so performed as to produce a metal coating on the article of a character such that paint will adhere thereto, and thereafter treating said metal coating with an acid sloution to remove discoloration of the coating therefrom without destroying the paint-adherent characteristic of the coating.

3. In the method of preparing articles having a paint adherent surface, the step consisting in subjecting an article previously galvanized according to a process which produces a discolored galvanized article having a discolored metal coating with the property of causing paint to adhere thereto to the action of an acid solution having a more pronounced action on the discoloration of the metal coating than on the metal coating itself to remove the discoloration without destroying the paint adherent property of the metal coating.

In testimony whereof I have hereunto set my hand.

CLARENCE S. BROCK.